United States Patent
Kopf et al.

(10) Patent No.: US 9,371,472 B2
(45) Date of Patent: Jun. 21, 2016

(54) ABRASION-RESISTANT, WOVEN-FABRIC ADHESIVE TAPE

(75) Inventors: Patrik Kopf, Hamburg (DE); Andreas Wahlers-Schmidlin, Guderhandviertel (DE)

(73) Assignee: TESA SE, Norderstedt (DE)

( * ) Notice: Subject to any disclaimer, the term of this patent is extended or adjusted under 35 U.S.C. 154(b) by 829 days.

(21) Appl. No.: 12/875,205

(22) Filed: Sep. 3, 2010

(65) Prior Publication Data

US 2011/0070393 A1 Mar. 24, 2011

(30) Foreign Application Priority Data

Sep. 18, 2009 (DE) .......................... 10 2009 041 898

(51) Int. Cl.
*C09J 7/04* (2006.01)

(52) U.S. Cl.
CPC .............. *C09J 7/04* (2013.01); *C09J 2201/622* (2013.01); *C09J 2203/302* (2013.01); *C09J 2400/263* (2013.01); *C09J 2467/006* (2013.01); *Y10T 428/23* (2015.01); *Y10T 442/2738* (2015.04)

(58) Field of Classification Search
CPC .. C09J 7/04; C09J 2201/622; C09J 2203/302; C09J 2400/263; C09J 2467/006; Y10T 428/23; Y10T 442/2738
USPC ............................ 428/343; 442/149, 203, 208
See application file for complete search history.

(56) References Cited

U.S. PATENT DOCUMENTS

| | | | | |
|---|---|---|---|---|
| 5,698,477 A | * | 12/1997 | Iwamaru et al. | 442/149 |
| 6,790,505 B1 | * | 9/2004 | Goux et al. | 442/149 |
| 8,227,064 B2 | * | 7/2012 | Keener et al. | 428/40.1 |
| 2003/0075268 A1 | * | 4/2003 | Neuhaus-Steinmetz et al. | 156/273.1 |
| 2006/0154546 A1 | * | 7/2006 | Murphy et al. | 442/286 |
| 2008/0286568 A1 | * | 11/2008 | Kopf et al. | 428/336 |
| 2010/0048074 A1 | * | 2/2010 | Wahlers-Shcmidlin et al. | 442/189 |
| 2010/0120310 A1 | | 5/2010 | Lanitz | |
| 2011/0067799 A1 | * | 3/2011 | Mussig et al. | 428/355 EN |
| 2011/0111665 A1 | * | 5/2011 | Lodde et al. | 442/220 |
| 2011/0226529 A1 | * | 9/2011 | Wittig et al. | 442/149 |

FOREIGN PATENT DOCUMENTS

| | | |
|---|---|---|
| DE | 102 29 527 A1 | 1/2004 |
| DE | 103 29 994 A1 | 1/2005 |
| DE | 600 31 332 T2 | 8/2007 |
| DE | 20 2007 006 816 U | 9/2008 |

(Continued)

OTHER PUBLICATIONS

English translation to EP 2050802 A1 to Hohmann et al., published Apr. 22, 2009, obtained from website of European Patent Office.*

(Continued)

*Primary Examiner* — Jeremy R Pierce
(74) *Attorney, Agent, or Firm* — Norris McLaughlin & Marcus, P.A.

(57) ABSTRACT

The invention relates to an adhesive tape composed of a carrier and of an adhesive layer applied on at least one side, the carrier being a woven fabric, preferably a woven polyester fabric, characterized in that the ratio of the linear density per unit length of the transverse threads to the linear density per unit width of the longitudinal threads is between 2.2 and 6 and the carrier has a basis weight of greater than or equal to 110 g/m².

14 Claims, 3 Drawing Sheets

(56) References Cited

FOREIGN PATENT DOCUMENTS

| | | |
|---|---|---|
| DE | 20 2007 008 003 U | 10/2008 |
| EP | 1 074 595 B1 | 2/2001 |
| EP | 1 300 452 A2 | 4/2003 |
| EP | 1 312 097 A1 | 5/2003 |
| EP | 1 315 781 A1 | 6/2003 |
| EP | 1 367 608 A2 | 12/2003 |
| EP | 1607459 A1 * 12/2005 | ............... C09J 7/04 |
| EP | 1 911 633 A1 | 4/2008 |
| EP | 1 911 824 A1 | 4/2008 |
| EP | 1990393 A1 * 11/2008 | ............... C09J 7/04 |
| EP | 2 050 803 A1 | 4/2009 |
| EP | 2050802 A1 * 4/2009 | ............... C09J 7/04 |
| EP | 2 322 385 A1 | 5/2011 |
| WO | 2006 108 871 A1 | 10/2006 |
| WO | 2008 138331 A1 | 11/2008 |

OTHER PUBLICATIONS

A computerized English translation of EP 1,990,393 to Lodde et al. (Nov. 12, 2008) obtained from European Patent Office's website.*
DIN 53 830 May 1981.

* cited by examiner

ABRASION-RESISTANT, WOVEN-FABRIC ADHESIVE TAPE

The invention relates to a highly abrasion-resistant tape, preferably for sheathing elongate material such as more particularly leads or cable looms, comprising a carrier to which a pressure-sensitive adhesive coating is applied preferably on at least one side. The invention further relates to the use of the tape and also to a cable harness wrapped with the tape of the invention.

Many sectors of industry wrap bundles composed of a multiplicity of electrical leads, before installation or in the ready-installed state, in order by such bandaging to reduce the space taken up by the bundle of leads and also, in addition, to obtain protective functions. With film-based adhesive tapes, a certain level of protection from ingress of fluid is achieved; with airy and bulky adhesive tapes based on thick nonwoven or foam carrier materials, insulating properties are obtained; and, when stable, abrasion-resistant carrier materials are used, a protective function against scuffing and rubbing is obtained.

The abrasion resistance is a measure of the scuff resistance of adhesive tapes.

An established method of determining the abrasion resistance of protective systems in the vehicle's electrics is the international standard ISO 6722, section 9.3 "Scrape abrasion test" (April 2002 edition). Based on the ISO 6722 standard, the abrasion resistance of adhesive tapes is tested in accordance with LV 312. The test specimen, with a length of approximately 10 cm, is adhered longitudinally in a single ply to a steel mandrel 5 or 10 mm thick. The abrading tool used is a steel wire of 0.45 mm diameter which rubs the test specimen centrally under a weight loading of 7 N. The numerical measure determined for the abrasion properties is the number of back-and-forth strokes taken to destroy the test specimen. In the case of a woven fabric, the direction of movement of the steel wire is oriented parallel to the warp threads.

The result of the test is called the abrasion class of the test specimen, with identification of the mandrel diameter and the weight loading. Classification of the adhesive tapes takes place into classes A to F according to Table 1.

With a 5 mm mandrel diameter, the test specimen is usually destroyed with fewer strokes than when a 10 mm diameter mandrel is used. Consequently, an adhesive tape may achieve abrasion class D at 10 mm and abrasion class C at 5 mm, for example.

TABLE 1

Division of abrasion classes under LV312 (February 2008)

| Abrasion class | Requirement |
| --- | --- |
| A No abrasion protection | <100 strokes |
| B Low abrasion protection | 100-499 strokes |
| C Moderate abrasion protection | 500-999 strokes |
| D High abrasion protection | 1000-4999 strokes |
| E Very high abrasion protection | 5000-14999 strokes |
| F Extremely high abrasion protection | ≥15000 strokes |

High abrasion resistance adhesive tapes, then, are adhesive tapes with abrasion class D. Nowadays, for high protection against abrasion, it is usual to use single-ply woven-fabric adhesive tapes consisting of a woven fabric carrier (woven polyester fabric, for example) and a layer of adhesive.

The woven carrier fabrics are characterized by the thread material (polyester yarn, for example), the thread weight of the threads (weight per unit length, unit: dtex; 1 dtex=1 g/10 000 m of thread), and the thread density or number of threads (number of threads per cm). Woven fabrics are composed of warp threads (longitudinal direction, machine direction, also corresponding to the longitudinal direction of the adhesive tape produced from them) and weft threads (transverse threads).

The threads are woven typically in plain-weave construction. Other types of construction are satin weave and twill weave. Fabrics woven in twill weave (for example, "2 over 1 twill") give rise to a so-called twill line, which runs diagonally to the machine direction.

Fabrics woven with twill weave are generally somewhat softer than the same fabrics in plain weave. In diagonal direction in particular, the flexural stiffness is lower. For adhesive tapes produced from these fabrics, this may be an advantage.

The threads may consist of spun yarns or filament yarns (continuous yarns). It is usual to use filament yarn. Such yarn consists of a fixed number of individual filaments, and may be textured or flat, with pointwise consolidation or no consolidation. The fabrics may be dyed subsequently or may consist of spundyed yarns.

Transverse linear density of a woven fabric is a term for the number of transverse threads (weft threads) per centimeter, multiplied by the thread weight of the transverse threads in dtex. The unit is dtex/cm.

Longitudinal linear density is a term for the number of longitudinal threads (warp threads) per centimeter, multiplied by the thread weight of the woven longitudinal threads in dtex. The unit is likewise dtex/cm.

The basis weight of the woven fabric is ultimately a product of the yarns used, their number, and the nature of the weave.

Woven polyester fabrics utilized as carriers for cable winding tapes have basis weights typically of between 60 and 140 $g/m^2$. The abrasion resistance of an adhesive tape increases in line with the basis weight of the woven polyester fabric used.

Woven polyester adhesive tapes for cable winding with protection against abrasion are known. Under the trade names "Tesa® 51026" or "Coroplast 837X" they are in use as cable winding tapes. They consist of a woven polyester fabric having a basis weight of 125 to 135 $g/m^2$ and of a layer of adhesive of 80 to 100 $g/m^2$. Warp threads and weft threads have the same yarn weight of around 167 dtex. As a result of the numerous warp threads with high yarn weights, the abrasion resistance of the adhesive tapes is high, and hence they meet LV312 abrasion class D for a 10 mm mandrel diameter.

The disadvantage of these known adhesive tapes is that, on account of the very numerous and very thick warp threads in the fabric used, in the longitudinal direction (in other words the processing direction, they are very stiff). Stiffness in longitudinal direction, for the use of the adhesive tape as a cable winding tape, has the disadvantage that the ends of the adhesive tape tend to stand up after a certain time. This behaviour is referred to as flagging.

It is exacerbated by high stiffness of the adhesive tape in longitudinal direction and by small diameters of the wrapped material.

The flagging tendency is reduced by high bond strength of the adhesive tape to its own reverse face following application. One of the preconditions for a high bond strength is a high adhesive coatweight on the adhesive tape.

If the fabric is used with a softer weave, such as twill weave, for example, the reduced flexural stiffness allows a reduction in the flagging tendency.

DE 20 2007 008 003 U describes an onward development of these known adhesive tapes. In order to attain the objective of a flagging-free product, the thread densities in longitudinal and transverse directions are lowered. The aim of this is to reduce the flexural stiffness of the adhesive tape and to prevent flagging.

Combining Table 2 and Table 3 of the above publication, however, shows the dilemma of this measure: the more the thread count is lowered, the softer the fabric becomes (smaller flexural stiffness value), but at the same time there is a sharp drop in the abrasion resistance of the adhesive tape produced from it. Even with a reduction in flexural stiffness to 3 or 4 mN*cm$^2$, abrasion class D can no longer be achieved for a 10 mm mandrel—in other words, the adhesive tape is no longer highly abrasion-resistant.

These flexural stiffness values, however, are necessary in order to obtain adhesive tapes which are flagging-free even over long service lives.

EP 1 074 595 B1 (and the priority-providing FR 99 10029 A) discloses a woven polyester adhesive tape which is tearable by hand. Abrasion resistance or abrasion class for the adhesive tape is not addressed.

The longitudinal linear density is said to be not more than 2500 dtex/cm, the transverse linear density not more than 4500 dtex/cm. This would give a basis weight for the fabric of not more than around 70 g/m$^2$. With such a low basis weight it is not possible to achieve abrasion class D at 10 mm.

DE 20 2007 006 816 U describes a woven-fabric adhesive tape which is tearable by hand and is composed of a woven polyester fabric and a layer of adhesive. The example cites a woven fabric having a longitudinal linear density of 2613 dtex/cm and a transverse linear density of 5200 dtex/cm.

The abrasion class is given as being C at 10 mm. This is plausible, since the arithmetic basis weight produced for the fabric is around 78 g/m$^2$, which is not sufficient to attain abrasion class D.

It is an object of the invention to obtain a marked improvement over the prior art and to provide a tape which has the capacity for bandaging individual leads to form cable looms with high protection against mechanical damage from scuffing and rubbing on sharp edges, burrs, or weld spots, and which does not exhibit flagging.

Additionally embraced by the concept of the invention are the use of the tape of the invention, and also a cable harness wrapped with the tape.

The invention accordingly provides an adhesive tape composed of a carrier and an adhesive layer applied at least to one side, the carrier being a woven fabric, preferably a woven polyester fabric.

It is essential to the invention that the ratio of the linear density per unit length of the transverse threads to the linear density per unit width of the longitudinal threads is between 2.2 and 6, preferably 2.8 and 4, and the carrier has a basis weight of greater than or equal to 110 g/m$^2$.

Surprisingly it is found that it is possible, when using woven-fabric carriers in which the transverse linear density is very much greater than the longitudinal linear density, to meet the requirements of absence of flagging at the same time as high abrasion resistance. The abrasion resistance attained in this context is abrasion class D, measured on a 10 mm mandrel in accordance with the standard LV312.

Particularly in the context of the thin threads in longitudinal direction, as provided in accordance with the invention, and for which it was necessarily assumed that they are of low mechanical stability, it is highly surprising that it is possible nevertheless to achieve the very high abrasion resistance in longitudinal direction.

The abrasion resistance is ensured unexpectedly through transverse threads having a high yarn weight and/or high thread count. As a consequence of this, a low flexural stiffness is obtained in the fabric and hence in the adhesive tape as well in the longitudinal direction.

The flexural stiffness of the fabric in the longitudinal direction is preferably below 3 mN*cm$^2$, measured to DIN 53362.

As a consequence of this, the flagging tendency of the adhesive tape is very low. For example, in the flagging test using the method of LV312, a value is obtained of zero millimeters. Owing to the relatively low requirements concerning the holding force of the tape on its reverse face, therefore, it is also possible, in accordance with the invention, for the adhesive coatweight to be low. This is beneficial for the overall thickness of the adhesive tape and for the running length on a roll of given outer diameter.

A further consequence of the possibility to set the longitudinal linear density at a low figure is the possibility of configuring the longitudinal threads in such way as to produce an adhesive tape having outstanding cutability. The ultimate tensile force of the adhesive tape in the longitudinal direction is preferably less than 115 N/cm. The yarn weight of the longitudinal threads (warp threads) is preferably not more than 90 dtex. It follows from this that the adhesive tape can be transversely severed right through very effectively with a tool such as shears. This offers advantages, particularly in the context of machine processing, since, among other things, the knives used therein become blunt less quickly. A high abrasion resistance is combined with effective cutability.

With further preference, the warp threads have a yarn weight of more than 30 dtex, more preferably 33 to 65 dtex, very preferably 50 to 60 dtex.

With further preference, the weft threads have a yarn density of between 220 and 470 dtex, preferably between 300 and 370 dtex.

In another advantageous embodiment of the invention, the thread count in the warp is 30 to 60/cm, preferably 45 to 60/cm, more preferably 48 to 55/cm, and/or the thread count in the weft is 20 to 40/cm, preferably 25 to 30/cm.

In another advantageous embodiment of the invention, the woven fabric is a woven polyester fabric. Further possibilities are woven polyamide fabric, woven viscose fabric, and/or a woven blend fabric of the stated materials.

The threads may be composed of spun yarns or filament yarns (continuous yarns). It is usual to use filament yarns. Such yarn is composed of a fixed number of individual filaments and may be textured or flat, with pointwise consolidation or no consolidation.

With further preference the thickness of the woven fabric is not more than 200 μm, more preferably 130 to 190 μm, very preferably 180 to 190 μm.

The carrier, in accordance with a further advantageous embodiment of the invention, has a basis weight of up to 200 g/m$^2$, preferably 114 to 140 g/m$^2$, more preferably 118 g/m$^2$.

The adhesive coatweight, based on the area of the adhesive tape, is preferably less than 90 g/m$^2$, more preferably more than 30 g/m$^2$. With very particular preference it is between 40 and 60 g/m$^2$.

As a result of this, the overall thickness of the adhesive tape is lower as compared with the prior art. This means that, with higher abrasion resistance, a product has a reduced thickness. An advantage of this is that the bandage is not applied so thickly around the elongate material, such as cable bundles, for example. This in turn allows thicker cable harnesses or narrower installation spaces, with no detriment to protection from abrasion.

In order to produce an adhesive tape from the carrier it is possible to employ any known adhesive systems. Besides natural or synthetic rubber based adhesives it is possible to make use, in particular, of silicone adhesives, and also of polyacrylate adhesives.

The adhesive is preferably a pressure-sensitive adhesive, in other words a viscoelastic composition which at room temperature in the dry state remains permanently tacky and adhesive. Bonding takes place through gentle applied pressure immediately to virtually all substrates.

One adhesive which is found to be particularly suitable is a low molecular mass, pressure-sensitive, acrylate hotmelt adhesive of the kind carried by BASF under the acResin UV name. This adhesive, with a low K value, acquires its application-compatible properties as a result of a concluding, radiation-induced crosslinking operation.

The adhesive coating is likewise preferably composed of an adhesive based on synthetic rubber, more particularly an adhesive comprising at least one vinylaromatic block copolymer and at least one tackifier resin. Typical use concentrations for the block copolymer lie at a concentration in the range between 30% and 70% by weight, more particularly in the range between 35% and 55% by weight.

As further polymers it is possible for those based on pure hydrocarbons, such as unsaturated polydienes, for example, such as natural or synthetically produced polyisoprene or polybutadiene, chemically substantially saturated elastomers, such as saturated ethylene-propylene copolymers, α-olefin copolymers, polyisobutylene, butyl rubber, ethylene-propylene rubber, for example, and also chemically functionalized hydrocarbons such as, for example, halogen-containing, acrylate-containing or vinyl ether-containing polyolefins to be present, and these polymers may replace up to half of the vinylaromatic-containing block copolymers.

The tackifiers used are tackifier resins which are compatible with the elastomer block of the styrene block copolymers.

As further additives it is possible typically to use light stabilizers, such as, for example, UV absorbers, sterically hindered amines, antiozonants, metal deactivators, processing auxiliaries, and endblock-reinforcing resins.

Plasticizing agents such as, for example, liquid resins, plasticizer oils or liquid polymers of low molecular mass, such as low molecular mass polyisobutylenes having molar masses <1500 g/mol (number average), or liquid EPDM types, are typically employed.

Fillers such as, for example, silicon dioxide, glass (ground or in the form of beads), aluminium oxides, zinc oxides, calcium carbonates, titanium dioxides, carbon blacks, to name but a few, and also colour pigments and dyes, and also optical brighteners, may likewise be used.

Pressure-sensitive adhesives are typically admixed with primary and secondary antioxidants in order to improve their ageing stability. Primary antioxidants react with oxy and peroxy radicals, which may form in the presence of oxygen, and react with them to form less reactive compounds. Secondary antioxidants effect reduction, for example, of hydroperoxides to alcohols. There is known to be a synergistic effect between primary and secondary ageing inhibitors, and so the protective effect of a mixture is frequently greater than the sum of the two individual effects.

If the adhesive tape described is to be of low flammability, this quality can be achieved by adding flame retardants to the carrier and/or to the adhesive. These retardants may be organobromine compounds, where appropriate with synergists such as antimony trioxide, although, with regard to the absence of halogen from the adhesive tape, preference will be given to using red phosphorus, organophosphorus compounds, mineral compounds or intumescent compounds, such as ammonium polyphosphate, alone or in conjunction with synergists.

The pressure-sensitive adhesives may be prepared and processed from solution, from dispersion and also from the melt. Preferred preparation and processing methods are from the melt. For the latter case, suitable preparation processes include both batch methods and continuous methods.

The adhesive may be applied partially, for example in the longitudinal direction of the adhesive tape, in the form of a stripe, the width of the stripe being lower than that of the carrier of the adhesive tape.

Depending on the particular utility, it is also possible for the carrier material to be coated with two or more parallel stripes of the adhesive.

The position of the stripe on the carrier is freely selectable, preference being given to an arrangement directly at one of the edges of the carrier.

On the adhesive coating of the carrier there may be at least one stripe of a covering, extending in the longitudinal direction of the adhesive tape and covering between 20% and 80% of the adhesive coating.

In accordance with one preferred embodiment of the invention there is precisely one stripe of the covering present on the adhesive coating.

The position of the stripe on the adhesive coating is freely selectable, with preference being given to an arrangement directly at one of the longitudinal edges of the carrier. In this way an adhesive stripe is produced which extends in the longitudinal direction of the adhesive tape and finishes at the other long edge of the carrier.

Where the adhesive tape is used to wrap a cable loom, by the adhesive tape being led in a helicoidal movement around the cable loom, the sheathing of the cable loom may be accomplished by bonding the adhesive of the adhesive tape only to the adhesive tape itself, with the material not coming into contact with any adhesive.

The cable loom wrapped in this way has a very high flexibility as a result of the absence of fixing of the cable by any adhesive. Consequently its flexibility on installation—particularly in narrow passages or sharp bends—is significantly increased.

If a certain degree of fixing of the adhesive tape on the material is desired, then wrapping may be accomplished by bonding part of the adhesive stripe to the adhesive tape itself, and another part to the material.

In accordance with another advantageous embodiment, the stripe is applied centrally on the adhesive coating, thereby producing two adhesive stripes extending on the long edges of the carrier in the longitudinal direction of the adhesive tape.

For the secure and economic application of the adhesive tape in said helicoidal movement around the cable loom, and to counter the slipping of the resultant protective sheathing, the two adhesive stripes each present on the long edges of the adhesive tape are advantageous, especially if one, which is usually narrower than the second stripe, serves as a fixing aid and the second, broader stripe serves as a fastener. In this way, the adhesive tape is bonded to the cable in such a way that the cable loom is secured against slipping but is nevertheless of flexible design.

In addition there are embodiments in which more than one stripe of the covering is applied to the adhesive coating. Where reference is made only to one stripe, the skilled person reads this, conceptually, as accommodating the possibility that there may well be two or more stripes covering the adhesive coating at the same time.

The stripe preferably covers a total of between 50% and 80% of the adhesive coating. The degree of coverage is selected as a function of the application and of the diameter of the cable loom.

With particular preference there remain one or two adhesive stripes, whose total width accounts for 20% to 50% of the width of the carrier.

Particularly if the adhesive coating is not a full-area coating but instead, for example, is in stripe form, the stated percentages relate to the width of the stripes of the jacket in relation to the width of the carrier, or, in accordance with the invention, the stripe or stripes of the jacket have a width which accounts for between 20% and 80% of the width of the carrier.

The adhesives thus prepared can then be applied to the carrier using the methods that are general knowledge. In the case of processing from the melt, these may be application methods via a nozzle or a calendar.

In the case of methods from solution, coatings with rods, blades or nozzles are known, to name but a few.

Also possible is the transfer of the adhesive from a nonstick backing cloth or release liner onto the carrier assembly.

The reverse face of the adhesive tape may be coated with a reverse-face lacquer in order to exert a favourable influence on the unwind properties of the adhesive tape wound to an Archimedean spiral. For this purpose this reverse-face lacquer may be furnished with silicone compounds or fluorosilicone compounds and also with polyvinylstearylcarbamate, polyethyleneiminestearylcarbamide or organofluorine compounds as adhesive substances.

The reverse-face lacquer should be used very sparingly, if at all, in order not to provoke flagging of the subsequently bonded adhesive tape.

The general expression "adhesive tape" in the context of this invention encompasses all sheetlike structures such as two-dimensionally extended films or film sections, tapes with extended length and limited width, tape sections and the like, and also, lastly, diecuts or labels.

The adhesive tape may be produced in the form of a roll, in other words wound up onto itself in the form of an Archimedean spiral, or lined on the adhesive side with release materials such as siliconized paper or siliconized film.

Suitable release material is preferably a non-linting material such as a polymeric film or a well-sized long-fibre paper.

The adhesive tape is preferably used for wrapping elongate material such as, more particularly, cable looms, with the elongate material being ensheathed in axial direction by the adhesive tape, or with the adhesive tape being led in a helical motion around the elongate material. The resulting form is that of a helix (also called screw, screw line, cylindrical spiral or coil; a helix is a line which winds with constant pitch around the surface of a cylinder).

Finally, the concept of the invention also embraces an elongate material wrapped with an adhesive tape of the invention. The elongate material preferably comprises a cable loom.

On the basis of the outstanding suitability of the adhesive tape, it can be used in a sheath which consists of a jacket in which the self-adhesive tape is present at least in an edge region of the jacket, and is bonded to the jacket in such a way that the adhesive tape extends over one of the longitudinal edges of the jacket, and preferably in an edge region which is narrow in comparison to the width of the jacket.

One product of this kind, and also optimized embodiments thereof, are disclosed in EP 1 312 097 A1. EP 1 300 452 A2, DE 102 29 527 A1 and WO 2006 108 871 A1 depicts onward developments, for which the adhesive tape of the invention is likewise very suitable. The adhesive tape of the invention can also be used in a process of the kind disclosed by EP 1 367 608 A2.

Lastly, EP 1 315 781 A1 and DE 103 29 994 A1 describe embodiments of adhesive tapes of a kind also possible for the adhesive tape of the invention.

BRIEF DESCRIPTION OF THE DRAWINGS

In the text below, the intention, using a number of figures, is to provide further details of the adhesive tape, without wishing thereby to impose a restriction of any kind whatsoever.

In the figures,

FIG. 1 shows in lateral section the adhesive tape, composed of a woven-fabric carrier 10, with a layer of a self-adhesive coating 12 applied on one side.

FIG. 2 shows in detail the woven fabric forming the carrier 10. A feature of the fabric is that the weft threads have a much greater thread weight than the warp threads.

FIG. 3 shows a section of a cable harness which is composed of a bundle of individual cables 7 and which is wrapped with the adhesive tape of the invention. The adhesive tape is led in a spiral movement around the cable harness.

Figure 1:
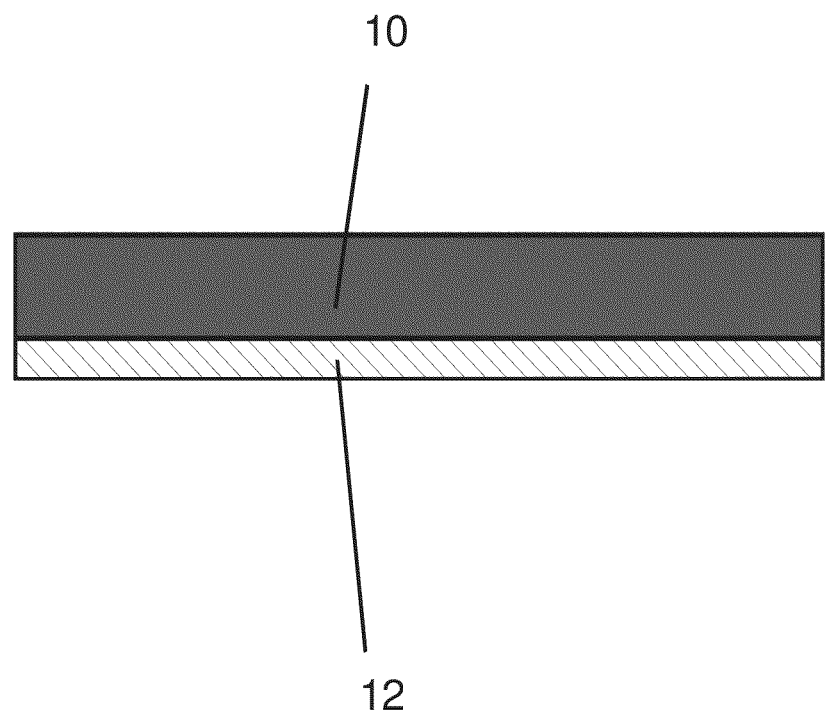
FIG. 1 shows the adhesive tape in lateral section.
Figure 2:
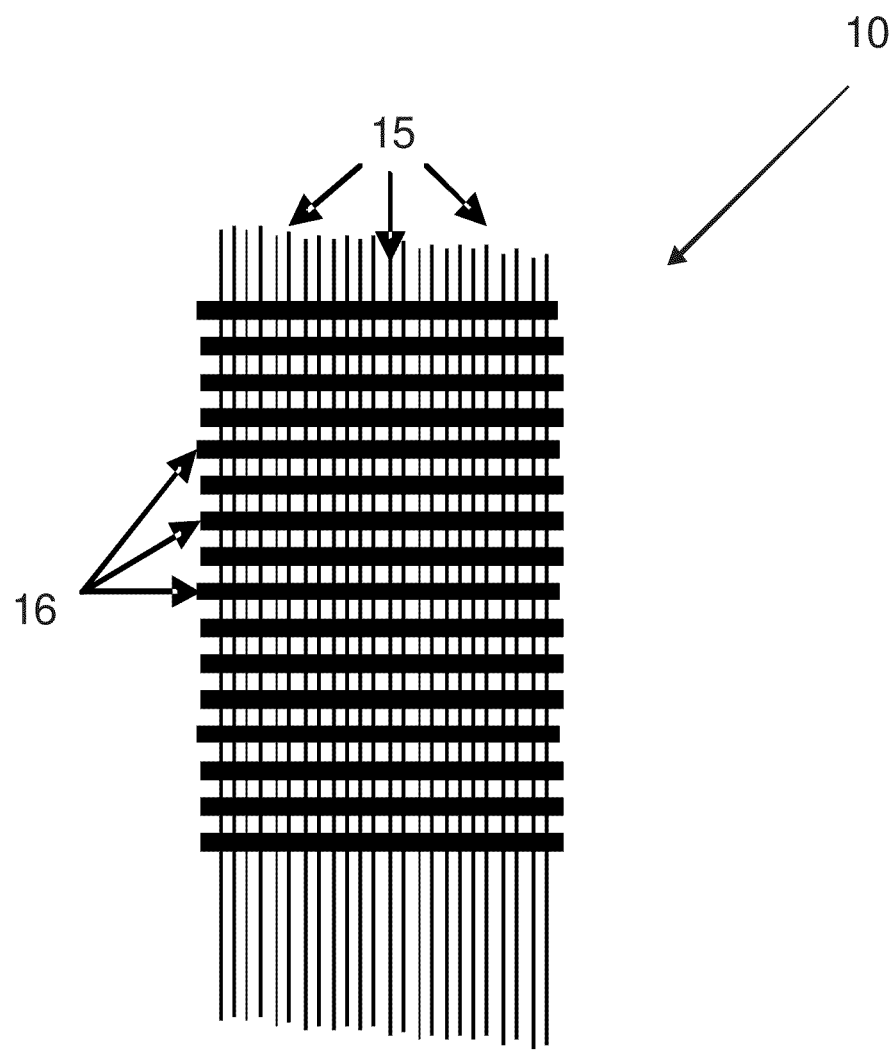
FIG. 2 shows the fabric forming the carrier.
Figure 3:
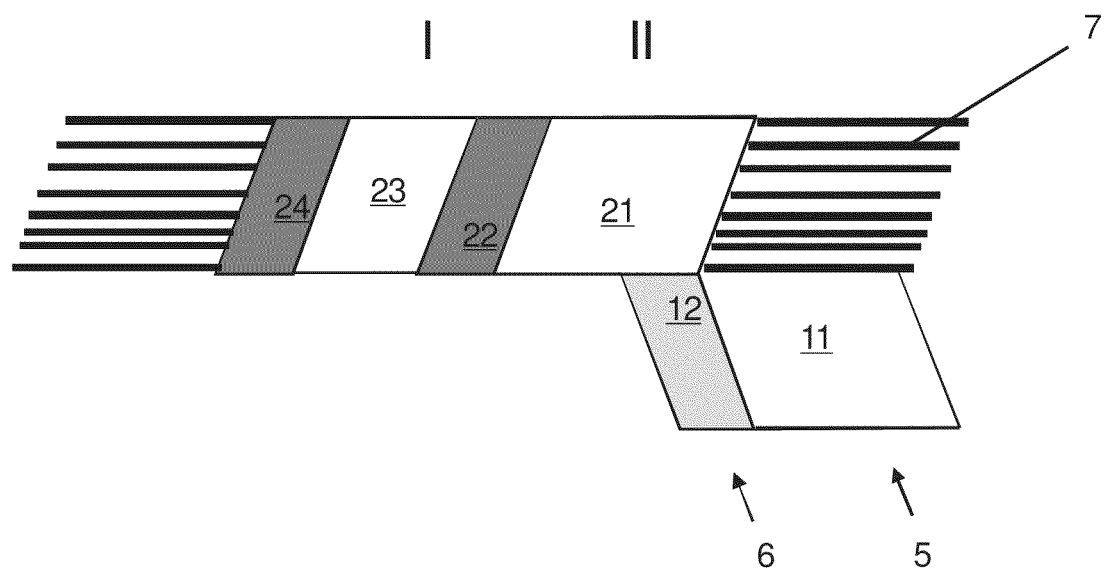
FIG. 3 shows a section of a cable harness which is composed of a bundle of individual cables and is wrapped with the adhesive tape of the invention.

The section of cable harness depicted shows two turns, I and II, of the adhesive tape. To the left there will be further turns extending, but they are not shown here.

On the adhesive coating there is a stripe 5 on the jacket, thus producing an adhesive stripe 6 extending in the longitudinal direction of the tape. Non-adhesive regions 11, 21, 23 of the adhesive tape alternate with adhesive regions 12, 22, 24. (The sections 22, 24, in contrast to the exposed adhesive 12, are not visible from the outside, which is why the denser shading has been chosen to represent them).

The cable harness is wrapped in such a way that the stripe 6 of adhesive bonds fully on the adhesive tape. Bonding with the cables 7 is ruled out.

The intention of the text below is to explain the invention in more detail, using one example and three counter-examples, without wishing these examples to restrict the invention in any way.

The measurements in these examples are made in accordance with the following standards Basis weights of the woven fabric and of the coating of adhesive in accordance with DIN EN ISO 2286-1

Yarn weight in accordance with DIN 53830 Part 3

Thread count in accordance with DIN EN 1049 Part 2

Ultimate tensile strength and ultimate-tensile-strength elongation of the woven fabrics and adhesive tapes in longitudinal direction in accordance with DIN EN 14410 at the maximum of the elongation-at-break curve (clamped length 100 mm, tensioning speed 300 mm/min)

Bond strength in accordance with DIN EN 1939

Thickness of the woven fabrics and adhesive tapes in accordance with DIN EN 1942

Abrasion resistance in accordance with LV312-1.

The flexural stiffness was measured in accordance with DIN 53362.

For the flagging test, the method of LV312 was developed further. The objective was to obtain results which are very close to actual use (tensions in the cable bundle, low bundle diameter):

A cable bundle is produced from 2 twisted cores with a lead cross-section of 0.35 mm², twisting with a length of lay of approximately 2 cm. The adhesive tapes are then wound by hand from the adhesive tape roll in a spot winding (100% overlap), severed by shears and pressed on firmly by hand. Length of the adhesive-tape section: 3.0 to 6.0 cm. The wrapped adhesive bundle is then stored, hanging freely, at room temperature. The length of the upright ends is measured after 7 days.

(I) Counter-example: tesa 51026
(II) Counter-example: example from DE 20 2007 006 816 U
(III) Counter-example: example from DE 20 2007 008 003 U
(IV) Inventive example

TABLE 2

Fabric constructions of woven fabrics of different woven-PET-fabric adhesive tapes

|  | (I) | (II) | (III) | (IV) Inventive |
|---|---|---|---|---|
| Carrier material | Woven PET fabric | Woven PET fabric | Woven PET fabric | Woven PET fabric |
| Basis weight | 130 g/m² | 70 g/m² | 105 g/m² | 118 g/m² |
| Thread count, longitudinal (warp) | 48/cm | 32/cm | 40/cm | 50/cm |
| Thread weight, longitudinal | 167 dtex | 84 dtex | 167 dtex | 55 dtex |
| Longitudinal linear density | 8016 dtex/cm | 2688 dtex/cm | 6680 dtex/cm | 2750 dtex/cm |
| Thread count, transverse (weft) | 23/cm | 30/cm | 20/cm | 27/cm |
| Thread weight, transverse | 167 dtex | 167 dtex | 167 dtex | 334 dtex |
| Transverse linear density | 3840 dtex/cm | 5010 dtex/cm | 3340 dtex/cm | 9018 dtex/cm |
| Ratio transverse linear density/ longitudinal linear density | 0.48 | 1.9 | 0.50 | 3.3 |
| Flexural stiffness in longitudinal direction | 7 to 8 mN * cm² | 0.5 to 2 mN * cm² | 4.5 to 5.5 mN * cm² | 1.0 to 2.5 mN * cm² |
| Ultimate tensile strength in longitudinal direction | 260 N/cm | 68 to 86 N/cm | 230 to 240 N/cm | 108 N/cm |

TABLE 3

Adhesive-tape properties of various woven-PET-fabric adhesive tapes

|  | (I) | (II) | (III) | (IV) Inventive |
|---|---|---|---|---|
| Type of adhesive | Acrylate | Synthetic rubber | Synthetic rubber | Acrylate |
| Adhesive coatweight | 95 g/m² | 60 g/m² | 82.5 g/m² | 50 g/m² |
| Total thickness | 0.26 mm | 0.16 to 0.18 mm | 0.215 mm | 0.19 mm |
| Bond strength to steel | 5.0 to 7.0 N/cm | 10 to 11 N/cm | 8.0 to 9.0 N/cm | 3.5 to 5.5 N/cm |
| Bond strength to own reverse face | 5.5 to 8.5 N/cm | 6 to 7 N/cm | 5.5 to 6.5 N/cm | 2.0 to 5.5 N/cm |
| Abrasion resistance 10 mm mandrel average | Class D | Class C | Class D | Class D |
| Abrasion resistance 5 mm mandrel average | Class C | Class B | Class C | Class C |
| Flagging after 7 days | 2 to 10 mm | 0 to 2 mm | 0 to 10 mm | 0 mm |

Example (IV) shows the advantages of the invention: high abrasion resistance of the adhesive tape in conjunction with low flexural stiffness in longitudinal direction. These two advantages can be combined if the ratio of transverse linear density to longitudinal linear density lies within the limits according to the invention.

Accordingly, even elongate material of low diameter can be wrapped without the ends of the tape exhibiting flagging.

The invention claimed is:

1. Adhesive tape comprising a polyester carrier and an adhesive layer applied on at least one side of the polyester carrier, the polyester carrier being a woven fabric consisting of polyester transverse (weft) threads and polyester longitudinal (warp) threads,
    wherein
    the warp threads have a yarn weight of more than 30 dtex and not more than 90 dtex;
    the weft threads have a yarn weight of between 220 and 470 dtex;
    the thread count in the warp is 30 to 60/cm;
    the thread count in the weft is 20 to 40/cm;
    the ratio of the linear density per unit length of the transverse threads to the linear density per unit width of the longitudinal threads is between 2.2 and 6; and
    the polyester carrier has a basis weight of greater than or equal to 110 g/m².

2. Adhesive tape according to claim 1, wherein the polyester carrier has a thickness, measured according to DIN EN 1942, of not more than 200 µm.

3. Adhesive tape according to claim 1, wherein
    the polyester carrier has a basis weight between 110 g/m² and 200 g/m².

4. Adhesive tape according to claim 1, wherein the adhesive tape possesses an ultimate tensile force, measured according to DIN EN 14410, of less than 115 N/cm.

5. Adhesive tape according to claim 1, wherein the abrasion resistance of the adhesive tape, measured on a 10 mm diameter mandrel to LV 312, meets at least abrasion class D and/or
    the abrasion resistance of the adhesive tape, measured on a 5 mm diameter mandrel to LV 312, meets at least abrasion class C.

6. Adhesive tape according to claim 1, wherein the flexural stiffness of the polyester carrier, measured according to DIN 53362, is less than 3 mN*cm².

7. Adhesive tape according claim 1, wherein the adhesive coatweight, based on the area of the adhesive tape, is less than 90 g/m.

8. Adhesive tape according to claim 1, wherein the adhesive coating is a self-adhesive coating, based on rubber, acrylate or silicone.

9. Method of wrapping elongate material, said method comprising leading the adhesive tape according to claim 1 in a helical line around the elongate material.

10. Method of claim 9, wherein the elongate material is sheathed in the axial direction by the adhesive tape.

11. Elongate material wrapped with an adhesive tape according to claim 1.

12. A method of providing reduced occurrence of flagging without adversely affecting the abrasion resistance of an adhesive tape in wrapping elongate material, said method comprising wrapping the elongate material with an adhesive tape comprising a polyester carrier and an adhesive layer applied on at least one side of the polyester carrier, the polyester carrier being a woven fabric consisting of polyester transverse (weft) threads and polyester longitudinal (warp) threads, wherein
    the warp threads have a yarn weight of more than 30 dtex and not more than 90 dtex;
    the weft threads have a yarn weight of between 220 and 470 dtex;
    the thread count in the warp is 30 to 60/cm;
    the thread count in the weft is 20 to 40/cm;
    the ratio of the linear density per unit length of the weft threads to the linear density per unit width of the warp threads is between 2.2 and 6; and
    the polyester carrier has a basis weight of greater than or equal to 110 g/m².

13. Adhesive tape comprising a polyester carrier and an adhesive layer applied on at least one side of the polyester carrier, the polyester carrier being a woven fabric consisting of polyester transverse (weft) threads and polyester longitudinal (warp) threads,
    wherein
    the warp threads have a yarn weight of more than 30 dtex and not more than 90 dtex;
    the weft threads have a yarn weight of between 220 and 470 dtex;
    the thread count in the warp is 30 to 60/cm;
    the thread count in the weft is 20 to 40/cm;
    the ratio of the linear density per unit length of the transverse threads to the linear density per unit width of the longitudinal threads is between 2.2 and 6; and
    the polyester carrier has a basis weight of greater than or equal to 110 g/m²;
    wherein the adhesive tape exhibits LV312 abrasion class D for a 10 mm mandrel diameter, and the adhesive tape exhibits a LV312 flagging value of 0 millimeters after 7 days.

14. A method of providing reduced occurrence of flagging without adversely affecting the abrasion resistance of an adhesive tape in wrapping elongate material, said method comprising wrapping the elongate material with an adhesive tape comprising a polyester carrier and an adhesive layer applied on at least one side of the polyester carrier, the polyester carrier being a woven fabric consisting of polyester transverse (weft) threads and polyester longitudinal (warp) threads, wherein
    the warp threads have a yarn weight of more than 30 dtex and not more than 90 dtex;
    the weft threads have a yarn weight of between 220 and 470 dtex;
    the thread count in the warp is 30 to 60/cm;
    the thread count in the weft is 20 to 40/cm;
    the ratio of the linear density per unit length of the weft threads to the linear density per unit width of the warp threads is between 2.2 and 6; and
    the polyester carrier has a basis weight of greater than or equal to 110 g/m²;
    wherein the adhesive tape exhibits LV312 abrasion class D for a 10 mm mandrel diameter, and the adhesive tape exhibits a LV312 flagging value of 0 millimeters after 7 days.

* * * * *